(12) United States Patent
Kursula (10) Patent No.: US 9,857,879 B2
(45) Date of Patent: Jan. 2, 2018

(54) FINGER GESTURE SENSING DEVICE (71) Applicant: Intel Corporation, Santa Clara, CA (US)

(72) Inventor: Mikko Kursula, Lempäälä (FI)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/854,324

(22) Filed: Sep. 15, 2015

(65) Prior Publication Data

US 2017/0075425 A1 Mar. 16, 2017

(51) Int. Cl.
G06F 3/01 (2006.01)

(52) U.S. Cl.
CPC .............. *G06F 3/017* (2013.01); *G06F 3/014* (2013.01)

(58) Field of Classification Search
CPC ......... G06F 3/014; G06F 3/017; G06F 3/0219
See application file for complete search history.

(56) References Cited

U.S. PATENT DOCUMENTS

| 2011/0007035 | A1* | 1/2011 | Shai | G06F 3/014 345/179 |
| 2012/0139708 | A1 | 6/2012 | Paradiso et al. | |
| 2013/0100169 | A1* | 4/2013 | Liao | G06F 3/014 345/660 |
| 2014/0274395 | A1* | 9/2014 | Ellsworth | A63F 13/00 463/37 |
| 2015/0062086 | A1 | 3/2015 | Nattukallingal | |
| 2015/0065082 | A1 | 3/2015 | Sehgal | |
| 2015/0241976 | A1 | 8/2015 | Zhao et al. | |

FOREIGN PATENT DOCUMENTS

WO 2014159141 A1 10/2014

OTHER PUBLICATIONS

PCT Search Report and Written Opinion for PCT Application No. PCT/US2016/042299 dated Oct. 7, 2016, 13 pages.

* cited by examiner

*Primary Examiner* — Kevin M Nguyen
(74) *Attorney, Agent, or Firm* — Finch & Maloney PLLC

(57) ABSTRACT

A figure gesture sensing device includes a ring-shaped housing, a transmitter, a receiver, and a computer processor. The housing is configured to be worn on a finger of a user. The transmitter is disposed in the housing and configured to emit a first signal into the finger of the user. The receiver is disposed in the housing and configured to detect a second signal. The second signal represents a resonance of the first signal emitted by the transmitter through the finger of the user. The computer processor is operatively coupled to the receiver and is configured to detect a motion gesture of the finger wearing the finger ring with respect to another portion of the human body based on the second signal. In some cases, the transmitter is configured to emit an ultrasonic acoustic signal, a low voltage electrical signal, or a radio frequency signal.

20 Claims, 5 Drawing Sheets

FINGER GESTURE SENSING DEVICE

BACKGROUND

In computing, a human interface device is a piece of hardware that a human can use to provide information and commands, among other things, to a computing device. Examples of conventional human interface devices include keyboards, mice, touch-sensitive pads and screens, and joysticks. These devices may be implemented, for instance, in desktop and laptop computers. While conventional keyboards, mice and touch screens work well in environments where the user is able to fully interact with the device with one or both hands (such as while sitting at a desk), increasingly computing devices are used in less static environments, such as where the user is walking, driving an automobile, or otherwise using the device in a way that is not conducive to a conventional keyboard/mouse/touch screen. Furthermore, some computing devices, such as mobile devices (e.g., smart phones), wearable devices (e.g., so-called smart eye glasses and wrist watches), and remotely controlled devices (e.g., audio, video, lighting, or environmental control equipment), often have minimal human interfaces due to their small form factors or other design considerations. The lack of a highly functional interface restricts the ability of a user to interact with certain features of the device. Some existing solutions include interfaces that are activated by voice or gaze tracking (eye movements). However, these techniques are not always suitable or practical. Thus, there is a need for an alternative interface for controlling a computing device.

DETAILED DESCRIPTION

Techniques are disclosed for a finger gesture sensing device for remotely interacting with or otherwise using an electronic device. In accordance with an embodiment of the present disclosure, a figure gesture sensing device includes a transmitter, a receiver, and a computer processor within a housing having the form factor of a finger ring. The finger ring is configured to be worn on a finger of a user. The transmitter in the finger ring is configured to emit a first signal (e.g., an acoustic ultrasonic signal) into the finger of the user. The receiver in the finger ring is configured to detect a second signal. The second signal represents a resonance of the first signal emitted by the transmitter through the finger of the user. The computer processor is operatively coupled to the receiver and is configured to detect a motion gesture of the finger wearing the finger ring with respect to another portion of the human body (e.g., another finger) based on the second signal as detected by the receiver. In some cases, the transmitter is configured to emit an ultrasonic acoustic signal, a low voltage electrical signal, or a radio frequency (RF) signal, and the computer processor is configured to measure a resonance frequency of the signal as detected by the receiver. In some embodiments, the finger gesture sensing device includes a wireless transmitter operatively coupled to the computer processor. The wireless transmitter is configured to wirelessly transmit data representing the detected gesture to a host device. In some embodiments, the finger gesture sensing device includes a power source operatively coupled to the transmitter, the receiver, and the computer processor, and may further include power source charging circuitry operatively coupled to the power source. In some embodiments, the computer processor is further configured to perform a process including causing the transmitter to emit the first signal over a period of time, causing the receiver to receive the second signal over the period of time, measuring a resonance pattern of the second signal, comparing the measured resonance pattern of the second signal against one of a plurality of pre-defined resonance patterns to determine a gesture corresponding to the measured resonance pattern, and sending data representing the determined gesture to a host device. In some cases, the process further includes causing the transmitter to modify a frequency of the first signal based at least in part on the measured resonance pattern of the second signal. Numerous configurations and variations of such techniques will be apparent in light of this disclosure.

As used herein, the term "gesture" refers to a movement or repositioning of one human body part with respect to another human body part (e.g., the rubbing together of an index finder and a thumb on the same hand). A series of gestures, such as tapping or rubbing two fingers together in a certain manner, forms a gesture pattern. Thus, a gesture may include, for example, a single discrete motion, or a series of motions that continuously flow together, or a series of motions with periods on inactivity or non-motion there between, or a combination of continuous motions and non-continuous motions. In a more general sense, a gesture is any activity that can be carried out and uniquely detected using the techniques provided herein, so as to provide input to an electronic system, machine, or computing device.

The various apparatuses and methodologies disclosed herein advantageously allow a user to interface with a computing device using finger gestures that are not in direct contact with the computing device, thereby allowing remote control of the computing device without using a keyboard, mouse, touch pad, voice commands or gaze tracking.

Example System

Figure 1:
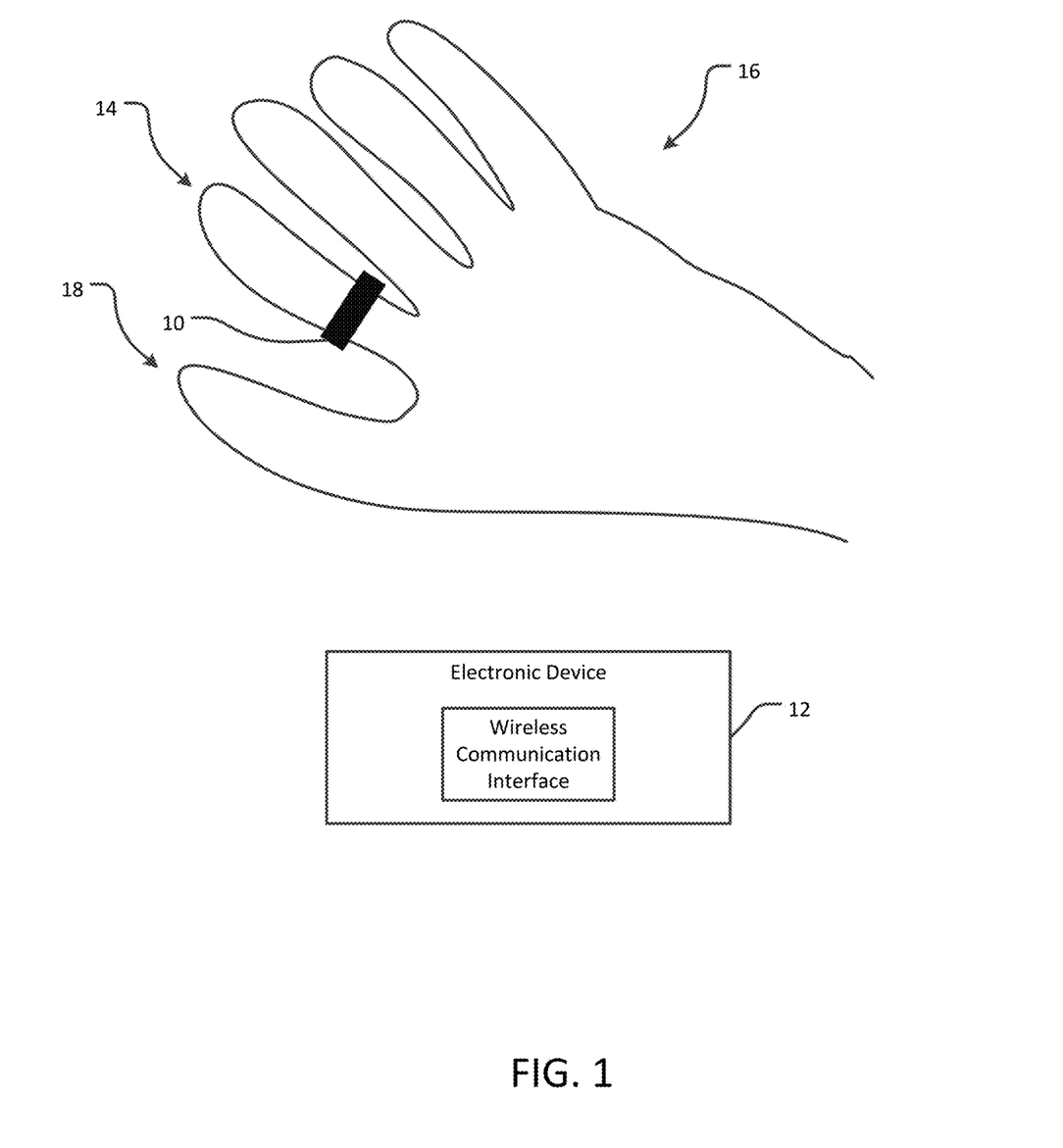
FIG. 1 is a diagram generally illustrating a communication system that includes a finger gesture sensing device for remotely sending inputs to an electronic device, in accordance with an embodiment of the present disclosure.

FIG. 1 is a diagram generally illustrating a finger gesture sensing device 10 for remotely sending inputs to an electronic device 12, in accordance with an embodiment of the present disclosure. The finger gesture sensing device 10 is integrated into a ring-shaped housing, which can be worn on a finger 14 of a human hand 16 (e.g., the index finger). The finger gesture sensing device 10 senses gestures of at least two fingers 14, 18 (e.g., the index finger and the thumb) by transmitting a signal, such as an acoustic ultrasonic signal, into the finger 14, receiving the signal (in a modified form), and measuring changes in the resonance of the signal over a period of time. The resonance is a standing wave type resonance that occurs when the waves travel in the finger tissues and reflect back from the tip of the finger(s), such as shown and described with respect to FIGS. 3 and 4. Changes in the acoustic resonance are induced by gestures of the fingers 14 and 18 touching each other at varying points, such as by touching or rubbing the fingers together, which modifies the harmonics of the fingers 14, 18, and more generally, of the hand 16 overall. Examples of such gestures are also described with respect to FIGS. 3 and 4. Resonance changes measured over a period of time are compared to a predefined resonance pattern to determine which gesture is being performed, such as described with respect to FIG. 5. The finger gesture sensing device 10 wirelessly transmits data representing the gesture to the electronic device 12 for further processing. Each gesture can be associated with a particular input to the electronic device 12. The input may, for example, represent a command to perform a certain function, acceptance or rejection of a user prompt, or selection of a parameter. In the illustrated embodiment, the finger gesture sensing device 10 includes, among other things, a processor, a memory, and an operating system. The finger gesture sensing device 10 and the electronic device 12 can each be coupled to a wireless communications network (e.g., via a Bluetooth device) to allow for communications between each other and with other computing devices or resources. Other componentry and functionality not reflected in FIG. 1 will be apparent in light of this disclosure, and it will be appreciated that other embodiments are not limited to any particular hardware configuration.

Figure 2:
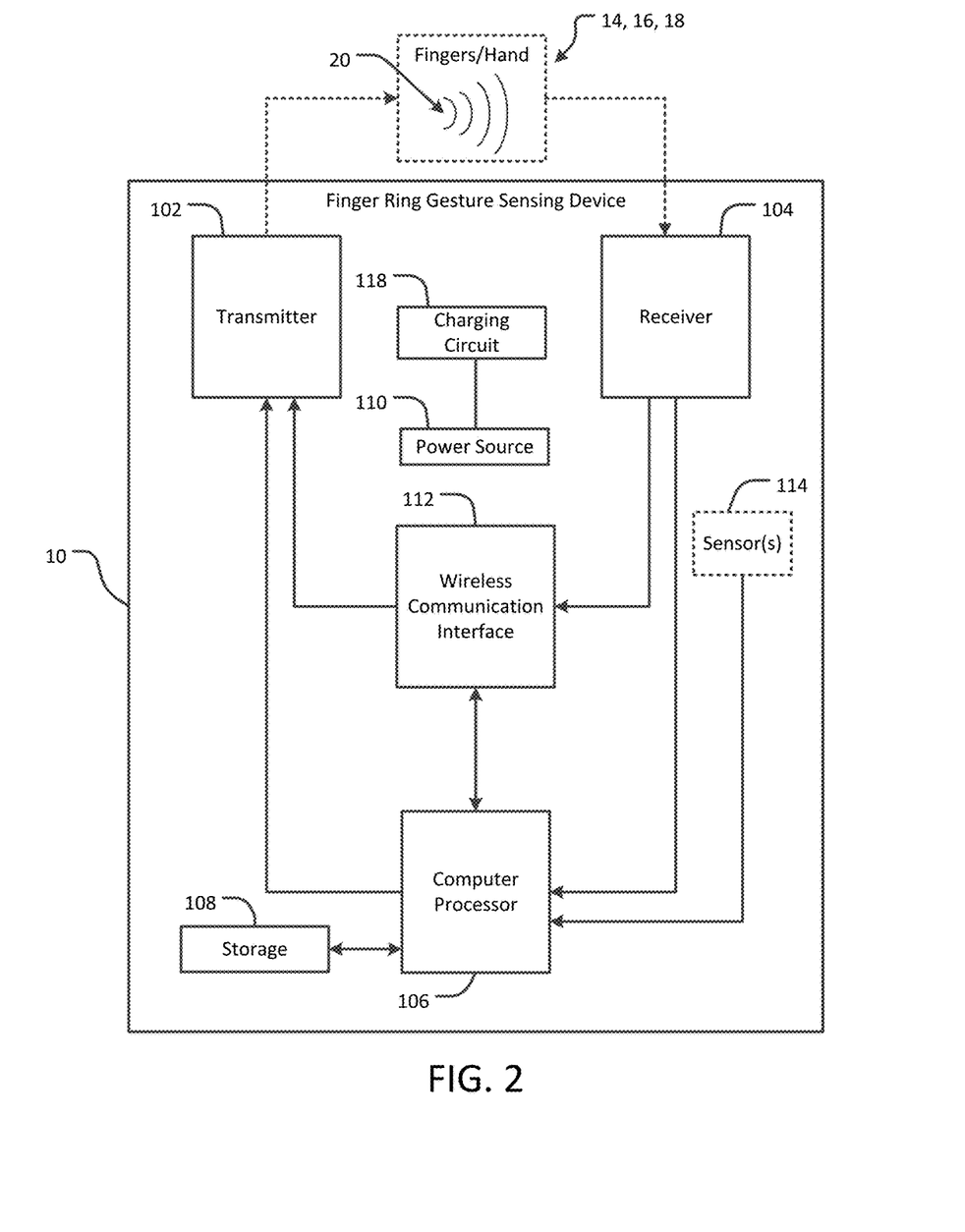
FIG. 2 is a block diagram of the finger gesture sensing device of FIG. 1, in accordance with an embodiment of the present disclosure.

FIG. 2 is a block diagram of the finger gesture sensing device 10 of FIG. 1, in accordance with an embodiment of the present disclosure. As noted with respect to FIG. 1, the finger gesture sensing device 10 can be integrated into a ring-shaped housing that is worn on a finger of a user. The finger gesture sensing device 10 includes a transmitter 102, a receiver 104, a computer processor 106 and associated storage 108, a power source 110, and a wireless communication interface 112. In some embodiments, the finger gesture sensing device 10 includes one or more sensors 114 for detecting motion of the finger ring gesture sensing device 10 or the proximity of the device 10 to other objects (e.g., an accelerometer for detecting inertial gestures and multi-sensor fusion type gesture sensing), although it will be understood that the sensors 114 are not necessarily present in all embodiments.

The transmitter 102 can be any suitable device for transmitting a wideband ultrasonic signal. For example, the transmitter 102 may include a piezoelectric transducer or a dynamic transducer, such as a transducer configured to generate an electromagnetic signal via a permanent or electromagnet. The receiver 104 can be any suitable device for receiving an ultrasonic signal, and in some cases may be integrated into the same component as the transmitter 102 or implemented as a separate component. For example, where electrical signals are utilized, the transmitter 102 and the receiver 104 may include conductive electrodes, such as steel or electrically conductive plastic. In another example, where RF signals are utilized, the transmitter 102 and the receiver 104 may include electrically isolated electrodes with a capacitive connection, or antennas. As shown in FIG. 2, the transmitter 102 can emit a signal 20 into the fingers 14, 18 and hand 16 of the user wearing the finger ring gesture sensing device 10. The usable frequencies of the signal 20 are, in some embodiments, between approximately 20 kHz and 100 kHz. In some embodiments, the signal emitted by the transmitter 102 may, for instance, include a broadband signal with random noise or a multitoned sine signal to simulate a standing wave resonance frequency. The emitted signal may, in certain embodiments, include a variable frequency to cover a range of possible resonance frequencies. The transmitter 102 can emit a signal from one point of the device 10 or from several points (e.g., around a portion of the finger ring or around the entire finger ring). As shown in FIG. 2, the receiver 104 can receive the signal 20 emitted by the transmitter 102. The received signal may be modified from the signal emitted by the transmitter 102 as it resonates in the tissues of the user's fingers 14, 18 and hand 16. For example, the resonance frequency may be defined by the distance between the finger ring and the tip of the finger 14. As noted above, the resonance is a standing wave type resonance that occurs when the waves travel in the finger tissues and reflect back from the tip of the finger, such as shown and described with respect to FIGS. 3 and 4.

Referring still to FIG. 2, the processor 106 can be any suitable processor, and may include one or more coprocessors or controllers to assist in control and processing operations associated with the finger ring gesture sensing device 10. The storage 108 can be implemented using any suitable type of digital storage, such as one or more of a disk drive, a universal serial bus (USB) drive, flash memory and/or random access memory (RAM). The processor 106 is configured to execute an operating system, which may comprise any suitable operating system, such as Linux, Google Android (Google Inc., Mountain View, Calif.), Microsoft Phone (Microsoft Corp., Redmond, Wash.), or Apple iOS (Apple Inc., Cupertino, Calif.). As will be appreciated in light of this disclosure, the techniques provided herein can be implemented without regard to the particular operating system provided in conjunction with computer processor 106, and therefore may also be implemented using any suitable existing or subsequently-developed platform. The wireless communications interface 112 can be any appropriate network chip or chipset which allows for wireless connection (e.g., Bluetooth) with other components, thereby enabling the finger gesture sensing device 10 to communicate with other local and/or remote computing systems, servers, and/or resources, including the electronic device 12 of FIG. 1. It will be understood that in some embodiments, the wireless communications interface 112 may include a wired communications interface, or may instead be strictly a wired communications interface. The power source 110 can include a battery or other component for storing an electrical charge, which powers the various components of the finger ring gesture sensing device 10, including the transmitter 102, receiver 104, computer processor 106, wireless communication interface 112, and sensors 114 (if present). In some embodiments, the finger gesture sensing device 10 includes charging circuitry 118 operatively coupled to the power source 110 for charging the power source 110. Any suitable power source technology can be used, including renewable power sources such as photovoltaic cells or power scavenging circuitry, or a combination of such sources such as a battery supplemented with photovoltaic cells. Numerous power schemes will be appreciated.

The various embodiments disclosed herein can be implemented in various forms of hardware, software, firmware, and/or special purpose processors. For example in one embodiment a non-transitory computer readable medium has instructions encoded thereon that, when executed by one or more processors, cause one or more of the object tracking methodologies disclosed herein to be implemented. The instructions can be encoded using a suitable programming language, such as C, C++, object oriented C, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be implemented, for example, using JavaScript or another suitable technology. The computer software methodologies disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus in other embodiments the finger gesture sensing device 10 may comprise additional, fewer, or alternative subcomponents as compared to those included in the example embodiment of FIG. 2.

The aforementioned non-transitory computer readable medium may be any suitable medium for storing digital information, such as a hard drive, a server, a flash memory, and/or random access memory (RAM). In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Example Usage Scenarios

Figure 3:
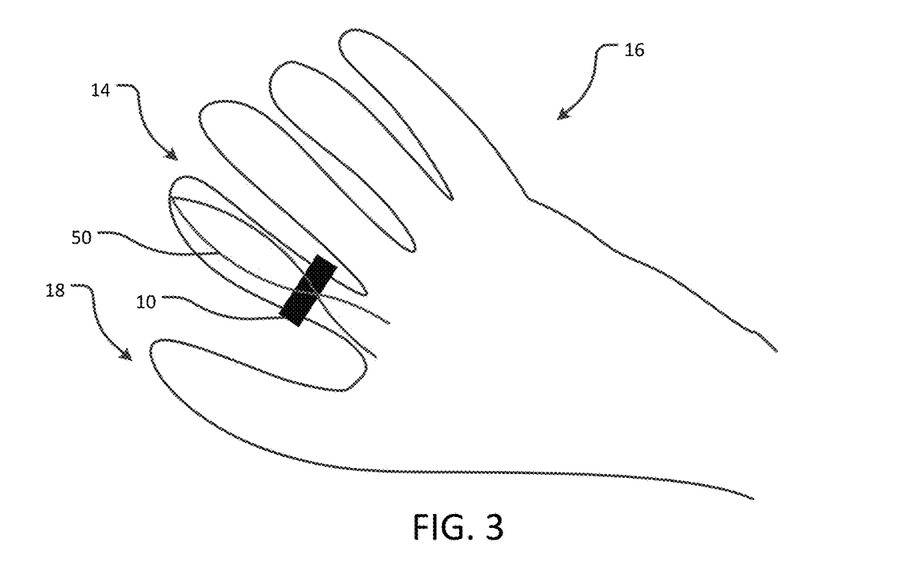
FIGS. 3 and 4 each show an example use case scenario the finger gesture sensing device of FIG. 1, in accordance with an embodiment of the present disclosure.
Figure 4:
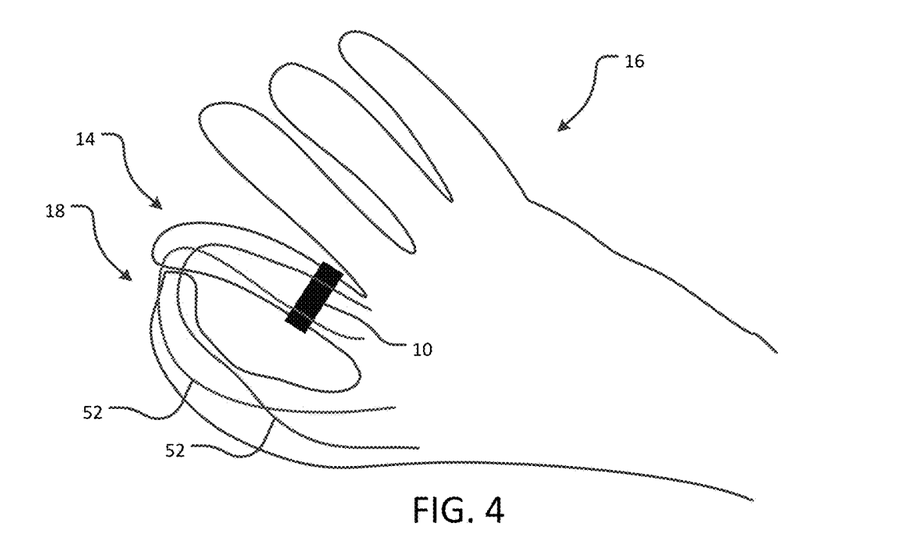

FIGS. 3 and 4 each show example use cases for the finger gesture sensing device 10, in accordance with an embodiment of the present disclosure. In the example scenario depicted in FIG. 3, the user is wearing the finger ring gesture sensing device 10 on the index finger 14 and the user's index finger 14 is separated from the user's thumb 18. When the index finger 14 is not in contact with the thumb 18, the resonance mode of the signal 20 emitted by the transmitter 102 is substantially equivalent to an acoustic pipe that is closed at one end (e.g., the tip of the finger 14) and open at the other end (e.g., the hand 16). A standing wave resonating signal 50 is symbolically depicted in FIG. 3 as resonating between the fingertip and the hand 16. However, as the user gestures with the fingers 14, 18, the resonance changes. For example, in FIG. 4, when the user presses the thumb 18 and index finder 14 tips together, the ultrasonic resonance frequency of the signal 20 emitted by the transmitter 102 changes within the index finger 14 and thumb 18. In this situation, the resonance mode is substantially equivalent to a longer acoustic pipe that is open at both ends. A standing wave resonating signal 52 is symbolically depicted in FIG. 4 as resonating between the tips of the fingers 14 and 18 and the hand 16. When the fingers 14 and 18 are moved relative to each other, the resonance frequency changes accordingly. Note that FIG. 4 illustrates one possible resonance mode, and that the finger ring gesture sensing device 10 may utilize higher order or lower order resonances than depicted.

In some cases, the computer processor 106 measures the signal received by the receiver 104 continuously while the finger ring gesture sensing device 10 is in operation. The resonance center frequency of the signal is analyzed by performing, for example, a Fast Fourier Transform (FFT) to the raw time domain data. In some cases, the obtained frequency data can be utilized to focus more transmitter energy into the measured frequency range. This can improve the detection signal-to-noise ratio. In any case, the observed frequency variations are compared against one or more pre-defined gesture patterns, such as the example patterns shown in FIG. 5. The computer processor 106 is configured to detect the gesture based on the observed frequency variations over a period of time and transmit the gesture information to a host device, e.g., the electronic device 12 of FIG. 1 via the wireless communication interface 112.

In addition to ultrasonic waves, the finger ring gesture sensing device 10 can use low voltage electrical signals, electromagnetic waves (radio frequency or RF) signals, or both to measure the resonance frequency of the fingers 14, 18.

Figure 5:
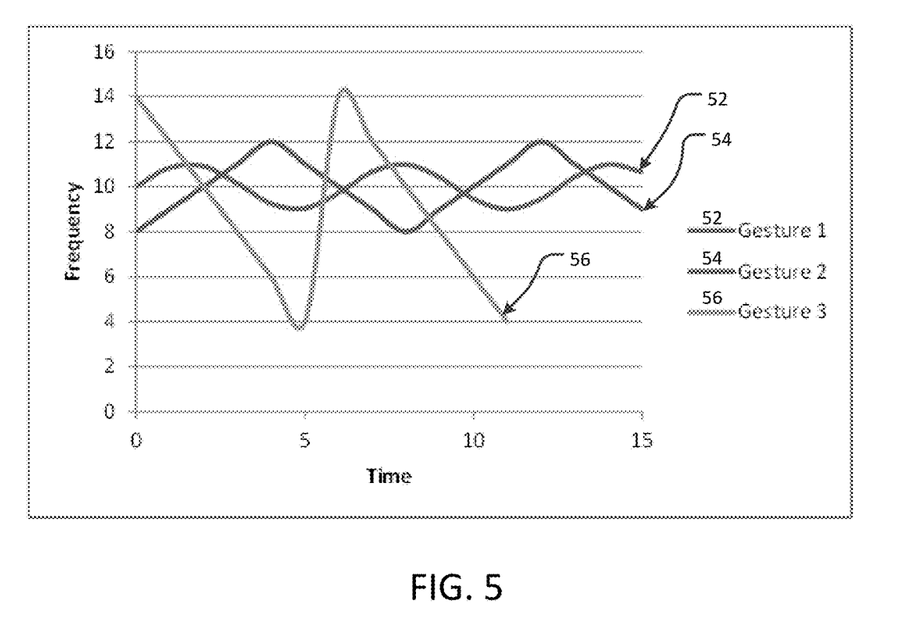
FIG. 5 graphically illustrates example variations of signal resonance resulting from gestures of a user wearing the finger gesture sensing device of FIG. 1, in accordance with certain embodiments of the present disclosure.

As discussed above, different gestures or motions of the fingers 14, 18 will create different resonance frequency patterns that can be detected by the finger gesture sensing device 10. FIG. 5 graphically illustrates several example variations of signal resonance resulting from gestures of the fingers 14, 18, in accordance with an embodiment of the present disclosure. Gesture 1 (52) may, for example, result from a circular motion of the finger tips against each other. Gesture 2 (54) may, for example, result from moving the thumb tip back and forth on the index finger. Gesture 3 (56) may, for example, result from moving the thumb tip from the base of the index finger towards the tip of the index finger and then repeating that movement. As can be seen in FIG. 5, the gestures can be detected from both the changes in the signal resonance as well as the rate of change of a period of time. For example, slowly moving the fingers together may represent a different gesture than quickly rubbing the fingers together. Furthermore, the sequence of motions (e.g., patterns or repetitions of finger movements) can be further used to discriminate between different gestures. It will be appreciated in view of this disclosure that any number of resonance variations can be formed by different gestures of the fingers 14, 18. Each of these gestures can be associated with a particular input that is sent to the electronic device 12 for further processing.

Methodology

Figure 6:
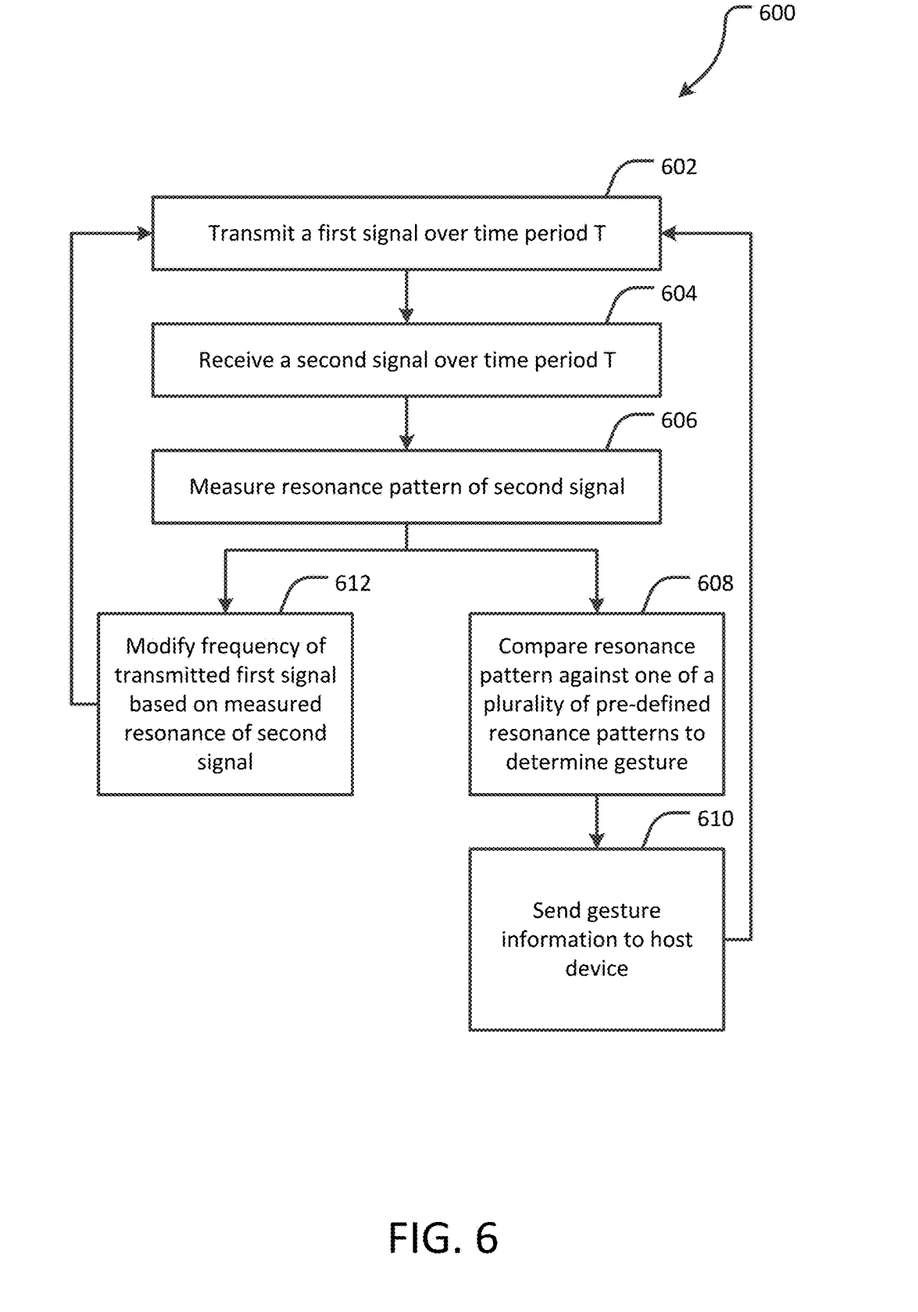
FIG. 6 is a flowchart illustrating an example method for detecting a gesture using the finger gesture sensing device of FIG. 1, in accordance with certain embodiments of the present disclosure.

FIG. 6 is a flowchart illustrating an example method 600 for detecting a gesture using the finger gesture sensing device 10, in accordance with an embodiment of the present disclosure. As can be seen, example method 600 includes a number of acts, the sequence of which may vary from one embodiment to another. However, when considered in the aggregate, act form a gesture detection process in accordance with certain of the embodiments disclosed herein. These embodiments can be implemented, for example using the system architecture illustrated in FIG. 2, as described above. However other system architectures can be used in other embodiments, as will be apparent in light of this disclosure. To this end, the correlation of the various functions shown in FIG. 6 to the specific components illustrated in FIG. 2 is not intended to imply any structural and/or use limitations. Rather other embodiments may include, for example, varying degrees of integration wherein multiple functionalities are effectively performed by one system. For example, in an alternative embodiment some or all of the functions of method 600 can be performed by a remote device, such as the electronic device 12 of FIG. 1. Numerous variations and alternative configurations will be apparent in light of this disclosure.

As illustrated in FIG. 6, in one embodiment the method 600 commences by transmitting 602 or emitting a first signal over time period T. The first signal may, for example, be transmitted by the transmitter 102 of FIG. 2 from the finger ring into a finger of a user wearing the finger ring. The first signal may, for example, include a wideband acoustic ultrasonic signal having a certain frequency (e.g., between approximately 20 kHz and 100 kHz). In some embodiments, the first signal may, for example, include a broadband signal with random noise or a multitoned sine signal to simulate a standing wave resonance frequency. The first signal may, in certain embodiments, include a variable frequency to cover a range of possible resonance frequencies. The method 600 continues by receiving 604 a second signal over the time period T. The second signal represents the first signal resonating within the user's fingers and hand. The method 600 continues by measuring 606 a resonance pattern of the second signal, as received over the time period T. The measured resonance pattern may include variations in the time domain, such as shown in FIG. 5. The resonance pattern may correspond with one or more pre-defined resonance patterns. The method 600 includes comparing 608 the measured resonance pattern against one or more pre-defined resonance patterns to determine a gesture performed by the user's fingers. The pre-defined resonance patterns may be associated with unique inputs that can be provided to a host device (e.g., the electronic device 12 of FIG. 1). If the measured resonance pattern matches one of the pre-defined resonance patterns, data representing the gesture corresponding to the measured resonance pattern is sent 610 to the host device. Further, to improve the signal-to-noise ratio, the method 600 include modifying 612 the frequency of the first signal based on the measured resonance frequency (e.g., to focus more energy in the frequency range corresponding to the resonance). Method 600 may be repeated continuously while, for example, the finger gesture sensing device 10 is operational.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled", however, may also mean that two or more elements are not in direct contact with each other, but yet still cooperate or interact with each other.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing", "computing", "calculating", "determining", or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a figure gesture sensing device. The finger gesture sensing device includes a ring-shaped housing configured to be worn on a finger of a human body; a transmitter disposed in the ring-shaped housing, the transmitter configured to emit a first signal; a receiver disposed in the ring-shaped housing, the receiver configured to detect a second signal, the second signal representing a resonance of the first signal emitted by the transmitter; and a computer processor operatively coupled to the receiver, the computer processor being configured to detect a motion gesture of the finger wearing the ring-shaped housing with respect to another portion of the human body based on the second signal as detected by the receiver.

Example 2 includes the subject matter of Example 1, where the transmitter is configured to emit an ultrasonic acoustic signal, a low voltage electrical signal, a radio frequency (RF) signal, or any combination of these.

Example 3 includes the subject matter of any of Examples 1-2, where the computer processor is configured to measure a resonance frequency of the signal as detected by the receiver.

Example 4 includes the subject matter of any of Examples 1-3, including a wireless transmitter operatively coupled to the computer processor, the wireless transmitter being configured to wirelessly transmit data representing the detected gesture.

Example 5 includes the subject matter of any of Examples 1-4, including a power source operatively coupled to the transmitter, the receiver, the computer processor, or any combination of these.

Example 6 includes the subject matter of Example 5, comprising power source charging circuitry operatively coupled to the power source.

Example 7 includes the subject matter of any of Examples 1-6, where the computer processor is configured to perform a process including causing the transmitter to emit the first signal over a period of time; causing the receiver to receive a second signal over the period of time; measuring a resonance pattern of the second signal; comparing the measured resonance pattern of the second signal against one of a plurality of pre-defined resonance patterns to determine a gesture corresponding to the measured resonance pattern; and sending data representing the determined gesture to a host device.

Example 8 includes the subject matter of Example 7, where the process includes causing the transmitter to modify a frequency of the first signal based at least in part on the measured resonance pattern of the second signal.

Example 9 is a method for sensing a gesture using a finger gesture sensing device. The finger gesture sensing device includes a ring-shaped housing configured to be worn on a finger of a human body, a transmitter disposed in the ring-shaped housing and configured to emit a first signal, and a receiver disposed in the ring-shaped housing and configured to detect a second signal, the second signal representing a resonance of the first signal emitted by the transmitter. The method includes causing the transmitter to emit the first signal over a period of time; causing the receiver to receive the second signal over the period of time; measuring, by a computer processor, a resonance pattern of the second signal; comparing, by the computer processor, the measured resonance pattern of the second signal against one of a plurality of pre-defined resonance patterns to determine a gesture corresponding to the measured resonance pattern; and sending, by the computer processor, data representing the determined gesture to a host device.

Example 10 includes the subject matter of Example 9, where the method includes causing the transmitter to modify a frequency of the first signal based at least in part on the measured resonance pattern of the second signal.

Example 11 includes the subject matter of any of Examples 9-10, where the transmitter is configured to emit an ultrasonic acoustic signal, a low voltage electrical signal, a radio frequency (RF) signal, or any combination of these.

Example 12 includes the subject matter of any of Examples 9-11, where the finger gesture sensing device includes a wireless transmitter operatively coupled to the computer processor, the wireless transmitter being configured to wirelessly transmit data representing the detected gesture.

Example 13 includes the subject matter of any of Examples 9-12, where the finger gesture sensing device includes a power source operatively coupled to at least one of the transmitter and the receiver.

Example 14 includes the subject matter of Example 13, where the finger gesture sensing device includes power source charging circuitry operatively coupled to the power source.

Example 15 is a non-transitory computer readable medium having instructions encoded thereon that, when executed by one or more processors, cause a process for sensing a gesture using a finger gesture sensing device to be carried out. The finger gesture sensing device includes a ring-shaped housing configured to be worn on a finger of a human body, a transmitter disposed in the ring-shaped housing and configured to emit a first signal, and a receiver disposed in the ring-shaped housing and configured to detect a second signal, the second signal representing a resonance of the first signal emitted by the transmitter. The process includes causing the transmitter to emit the first signal over a period of time; causing the receiver to receive the second signal over the period of time; measuring, by a computer processor, a resonance pattern of the second signal; comparing, by the computer processor, the measured resonance pattern of the second signal against one of a plurality of pre-defined resonance patterns to determine a gesture corresponding to the measured resonance pattern; and sending, by the computer processor, data representing the determined gesture to a host device.

Example 16 includes the subject matter of Example 15, where the process includes causing the transmitter to modify a frequency of the first signal based at least in part on the measured resonance pattern of the second signal.

Example 17 includes the subject matter of any of Examples 15-16, where the transmitter is configured to emit an ultrasonic acoustic signal, a low voltage electrical signal, a radio frequency (RF) signal, or any combination of these.

Example 18 includes the subject matter of any of Examples 15-17, where the finger gesture sensing device includes a wireless transmitter operatively coupled to the computer processor, the wireless transmitter being configured to wirelessly transmit data representing the detected gesture.

Example 19 includes the subject matter of any of Examples 15-18, where the finger gesture sensing device includes a power source operatively coupled to at least one of the transmitter and the receiver.

Example 20 includes the subject matter of Example 19, where the finger gesture sensing device includes power source charging circuitry operatively coupled to the power source.

The foregoing description of example embodiments is presented for the purposes of illustration and description. It is not intended to be exhaustive or to limit this disclosure to the precise forms described. Many modifications and variations are possible in light of this disclosure. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A finger gesture sensing device comprising:
   a ring-shaped housing configured to be worn on a finger of a human body;
   a transmitter disposed in the ring-shaped housing, the transmitter configured to emit a first signal at a first frequency, the first signal being emitted into the finger wearing the ring-shaped housing;
   a receiver disposed in the ring-shaped housing, the receiver configured to detect a second signal, the second signal representing a resonance of the first signal emitted through the finger by the transmitter; and
   a computer processor operatively coupled to the receiver, the computer processor being configured to:
     detect a motion gesture of the finger wearing the ring-shaped housing with respect to another portion of the human body based on the second signal as detected by the receiver;
     measure a resonance pattern of the second signal; and
     cause, in response to measuring the resonance pattern, the transmitter to emit the first signal at a second frequency that is different than the first frequency, the second frequency being a function of the measured resonance pattern of the second signal.

2. The device of claim 1, wherein the transmitter is configured to emit one of an ultrasonic acoustic signal, a low voltage electrical signal, and a radio frequency (RF) signal.

3. The device of claim 1, wherein the computer processor is further configured to measure a resonance frequency of the signal as detected by the receiver.

4. The device of claim 1, further comprising a wireless transmitter operatively coupled to the computer processor, the wireless transmitter being configured to wirelessly transmit data representing the detected gesture.

5. The device of claim 1, further comprising a power source operatively coupled to at least one of the transmitter, the receiver, and the computer processor.

6. The device of claim 5, further comprising power source charging circuitry operatively coupled to the power source.

7. The device of claim 1, wherein the computer processor is further configured to:
   compare the measured resonance pattern of the second signal against one of a plurality of pre-defined resonance patterns to determine a gesture corresponding to the measured resonance pattern; and
   send data representing the determined gesture to a host device.

8. The device of claim 1, wherein the first signal is a broadband signal including a least one of random noise and a multitoned sine signal to simulate a standing wave resonance frequency.

9. A method for sensing a gesture using a finger gesture sensing device, the finger gesture sensing device comprising a ring-shaped housing configured to be worn on a finger of a human body, a transmitter disposed in the ring-shaped housing and configured to emit a first signal, and a receiver disposed in the ring-shaped housing and configured to detect a second signal, the method comprising:
   causing the transmitter to emit the first signal at a first frequency, the first signal being emitted into a finger wearing the ring-shaped housing;
   causing the receiver to receive the second signal, the second signal representing a resonance of the first signal emitted through the finger by the transmitter;
   measuring, by a computer processor, a resonance pattern of the second signal;
   causing, in response to measuring the resonance pattern, the transmitter to emit the first signal at a second frequency that is different than the first frequency, the second frequency being a function of the measured resonance pattern of the second signal;
   comparing, by the computer processor, the measured resonance pattern of the second signal against one of a plurality of pre-defined resonance patterns to determine a gesture corresponding to the measured resonance pattern; and
   sending, by the computer processor, data representing the determined gesture to a host device.

10. The method of claim 9, wherein the transmitter is configured to emit one of an ultrasonic acoustic signal, a low voltage electrical signal, and a radio frequency (RF) signal.

11. The method of claim 9, wherein the finger gesture sensing device further comprises a wireless transmitter operatively coupled to the computer processor, the wireless transmitter being configured to wirelessly transmit data representing the detected gesture.

12. The method of claim 9, wherein the finger gesture sensing device further comprises a power source operatively coupled to at least one of the transmitter and the receiver.

13. The method of claim 12, wherein the finger gesture sensing device further comprises power source charging circuitry operatively coupled to the power source.

14. The method of claim 9, wherein the first signal is a broadband signal including a least one of random noise and a multitoned sine signal to simulate a standing wave resonance frequency.

15. A non-transitory computer readable medium having instructions encoded thereon that, when executed by one or more processors, cause a process for sensing a gesture using a finger gesture sensing device to be carried out, the finger gesture sensing device comprising a ring-shaped housing configured to be worn on a finger of a human body, a transmitter disposed in the ring-shaped housing and configured to emit a first signal, and a receiver disposed in the ring-shaped housing and configured to detect a second signal, the process comprising:
   causing the transmitter to emit the first signal at a first frequency, the first signal being emitted into a finger wearing the ring-shaped housing;
   causing the receiver to receive the second signal, the second signal representing a resonance of the first signal emitted through the finger by the transmitter;
   measuring, by a computer processor, a resonance pattern of the second signal;
   causing, in response to measuring the resonance pattern, the transmitter to emit the first signal at a second frequency that is different than the first frequency, the second frequency being a function of the measured resonance pattern of the second signal;
   comparing, by the computer processor, the measured resonance pattern of the second signal against one of a plurality of pre-defined resonance patterns to determine a gesture corresponding to the measured resonance pattern; and sending, by the computer processor, data representing the determined gesture to a host device.

16. The computer readable medium of claim 15, wherein the transmitter is configured to emit one of an ultrasonic acoustic signal, a low voltage electrical signal, and a radio frequency (RF) signal.

17. The computer readable medium of claim 15, wherein the finger gesture sensing device further comprises a wireless transmitter operatively coupled to the computer processor, the wireless transmitter being configured to wirelessly transmit data representing the detected gesture.

18. The computer readable medium of claim 15, wherein the finger gesture sensing device further comprises a power source operatively coupled to at least one of the transmitter and the receiver.

19. The computer readable medium of claim 18, wherein the finger gesture sensing device further comprises power source charging circuitry operatively coupled to the power source.

20. The computer readable medium of claim 15, wherein the first signal is a broadband signal including a least one of random noise and a multitoned sine signal to simulate a standing wave resonance frequency.

* * * * *